United States Patent
Kesarwani et al.

(10) Patent No.: US 10,546,032 B2
(45) Date of Patent: Jan. 28, 2020

(54) SYSTEM AND METHOD FOR ASSOCIATION RULE MINING FROM ENCRYPTED DATABASES

(71) Applicant: International Business Machines Corporation, Armonk, NY (US)

(72) Inventors: Manish Kesarwani, Bangalore (IN); Krishnasuri Narayanam, Bangalore (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 15/819,410

(22) Filed: Nov. 21, 2017

(65) Prior Publication Data
US 2019/0155956 A1   May 23, 2019

(51) Int. Cl.
| | | |
|---|---|---|
| *G06F 21/60* | (2013.01) | |
| *G06F 16/9535* | (2019.01) | |
| *H04L 9/00* | (2006.01) | |
| *H04L 9/30* | (2006.01) | |
| *H04L 29/06* | (2006.01) | |
| *H04L 9/14* | (2006.01) | |

(52) U.S. Cl.
CPC .......... *G06F 16/9535* (2019.01); *H04L 9/008* (2013.01); *H04L 9/14* (2013.01); *H04L 9/30* (2013.01); *H04L 63/0428* (2013.01); *G06F 2216/03* (2013.01)

(58) Field of Classification Search
CPC ....... G06F 21/60; G06F 21/78; G06F 2212/40
USPC ................................. 713/192, 193, 164, 165
See application file for complete search history.

(56) References Cited

U.S. PATENT DOCUMENTS

| | | | |
|---|---|---|---|
| 9,147,079 B2 | 9/2015 | Furukawa | |
| 9,189,647 B2 | 11/2015 | Furukawa | |
| 9,213,867 B2 | 12/2015 | Ramamurthy et al. | |
| 9,946,810 B1 * | 4/2018 | Trepetin | H04L 63/0428 |

(Continued)

FOREIGN PATENT DOCUMENTS

CN     106534313 A     3/2017

OTHER PUBLICATIONS

English translation for China Application No. CN106534313A.
(Continued)

*Primary Examiner* — Izunna Okeke
(74) *Attorney, Agent, or Firm* — Ryan, Mason & Lewis, LLP

(57) ABSTRACT

Methods, systems and computer program products for association rule mining of an encrypted database are provided herein. A computer-implemented method includes receiving, at a first cloud computing environment, encrypted transaction data that are encrypted using an encryption scheme which provides additive homomorphism, wherein the transaction data comprise a plurality of combinations of two or more elements of a set of elements, receiving, at the first cloud computing environment, encrypted query data that are encrypted using the encryption scheme, wherein the query data comprise at least one of an element and a combination of two or more elements of the set of elements which are the subject of a query seeking a determination of whether at least one of the element and the combination of two or more elements is frequent, and computing addition of the encrypted query data with the encrypted transaction data.

16 Claims, 9 Drawing Sheets

(56) References Cited

U.S. PATENT DOCUMENTS

2004/0243816 A1* 12/2004 Hacigumus ........... H04L 9/0894
                                                            713/193
2014/0164758 A1    6/2014  Ramamurthy et al.
2017/0099262 A1    4/2017  Kerschbaum
2017/0103227 A1*   4/2017  Kerschbaum ....... G06F 21/6227
2018/0300497 A1*  10/2018  Carpov .............. G06F 21/6227
2019/0036678 A1*   1/2019  Ahmed ................. H04L 9/006

OTHER PUBLICATIONS

Wikipedia, "Apriori Algorithm," https://en.wikipedia.org/wiki/Apriori_algorithm, Oct. 6, 2017, 4 pages.

Wikipedia, "Cloud Database," https://en.wikipedia.org/wiki/Cloud_database, Oct. 3, 2017, 8 pages.

Wikipedia, "Encryption" https://en.wikipedia.org/wiki/Encryption, Oct. 3, 2017, 4 pages.

Wikipedia, "Homomorphism," https://en.wikipedia.org/wiki/Homomorphism, Sep. 4, 2017, 10 pages.

invotes.com, "Multiplicative vs Additive Homomorphic ElGamal," https://invotes.com/multiplicative-vs-additive-homomorphic-elgamal/, May 22, 2016, 12 pages.

X. Yi et al., "Privacy-Preserving Association Rule Mining in Cloud Computing," Proceedings of the 10th ACM Symposium on Information, Computer and Communications Security (Asia CCS), Apr. 14-17, 2014, pp. 439-450, Singapore, Southeast Asia.

* cited by examiner

205

| $L_0$ | Transactions | Count |
|---|---|---|
| {1} | {{2, 5}, {2, 3}, {2, 3, 9}} | 3 |
| {2} | {{3, 6}, {3, 4}, {3, 4, 10}} | 2 |
| {4} | {{5, 8}, {5, 6}, {5, 6, 12}} | 1 |
| {8} | {{9, 12}, {9, 10}, {9, 10, 16}} | 1 |

| $L_1$ | Transactions | Count |
|---|---|---|
| {1, 2} | {{2, 5, 3, 6}, {2, 3, 4}, {2, 3, 9, 4, 10}} | 2 |

| ID | Transactions |
|---|---|
| 1 | {1, 4, 5} |
| 2 | {2, 4, 6} |
| 3 | {1, 3, 4, 5, 6} |
| 4 | {2, 5} |
| 5 | {1, 3, 5, 6} |

| ID | Transactions |
|---|---|
| 1 | {^wy, &3h, ywu} |
| 2 | {*tg, &#g, uys} |
| 3 | {7q2, ^4g, jsd, u*t, &w6} |
| 4 | {*wu, *&^} |
| 5 | {jsu, 7Ay, Js8, &w6} |

Receive Encrypted Transaction Data that are Encrypted Using an Encryption Scheme which Provides Additive Homomorphism, Wherein the Transaction Data Comprise a Plurality of Combinations of Two or More Elements of a Set of Elements — 601

↓

Receive Encrypted Query Data that are Encrypted Using the Encryption Scheme, Wherein the Query Data Comprise at Least One of an Element and a Combination of Two or More Elements of the Set of Elements Which are the Subject of a Query Seeking a Determination of Whether at Least One of the Element and the Combination of Two or More Elements is Frequent — 603

↓

Compute Addition of the Encrypted Query Data with the Encrypted Transaction Data — 605

FIG. 6

SYSTEM AND METHOD FOR ASSOCIATION RULE MINING FROM ENCRYPTED DATABASES

FIELD

The present invention relates to data mining, and more specifically, to techniques for association rule mining of an encrypted database.

BACKGROUND

In general, encryption is a process by which data are encoded to enable only those with authorization to access the data. Unencrypted data, referred to as plaintext, can be encrypted using cipher, which is an encryption algorithm, in order to generate ciphertext, which must be decrypted before it can be read. Authorized recipients of the data are able to decrypt the data using a key, which can be provided by the holder of the data to the authorized recipients.

Database owners are adopting encryption solutions to protect their critical data. Encryption and the data security associated therewith become more important when a database is hosted in a cloud environment. Cloud hosted encrypted databases provide services such as, for example, database as a service (DBaaS), and analytics as a service (AaaS). With DBaaS, a data owner generates a database and sends its database to the service provider, which then maintains the database and provides query processing over the database. A service provider that provides AaaS provides analytics software and operations through web-delivered technologies so that businesses or other enterprises do not need to develop their own internal hardware setups to perform business analytics.

Association rules are conditional (e.g., if/then) statements used for determining relationships between data that may be present in a relational database or other type of information repository. A non-limiting example of an association rule is "If a consumer purchases bread, the consumer is 80% likely to also purchase butter". As can be seen, an association rule includes an antecedent (e.g., if) and a consequent (e.g., then). Data mining for association rules (which can be referred to herein as "association rule mining") may be used in connection with the analysis and prediction of customer behavior, and/or in connection with machine learning.

Association rules can be created based on data that include frequent antecedent/consequent (e.g., if/then) patterns and support and confidence values to identify noteworthy relationships. Support is an indication of the frequency of items in a database, and confidence corresponds to the number of times the conditional statements have been determined to be true.

Not all kinds of database services currently include encrypted databases. For example, while association rule mining from a database with plaintext data is known, association rule mining from an encrypted database has not been performed.

SUMMARY

Embodiments of the invention provide techniques for data mining, and more particularly, to association rule mining of an encrypted database.

According to another exemplary embodiment of the present invention, a computer-implemented method comprises receiving, at a first cloud computing environment, encrypted transaction data that are encrypted using an encryption scheme which provides additive homomorphism, wherein the transaction data comprise a plurality of combinations of two or more elements of a set of elements, receiving, at the first cloud computing environment, encrypted query data that are encrypted using the encryption scheme, wherein the query data comprise at least one of an element and a combination of two or more elements of the set of elements which are the subject of a query seeking a determination of whether at least one of the element and the combination of two or more elements is frequent, computing addition of the encrypted query data with the encrypted transaction data, partitioning a result of the addition of the encrypted query data with the encrypted transaction data into at least two subsets comprising different portions of the result of the addition, transmitting a first of the at least two subsets from the first cloud computing environment to a second cloud computing environment, and transmitting a second of the at least two subsets from the first cloud computing environment to a third cloud computing environment.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a table illustrating application of an Apriori algorithm to determine frequency of items, according to an exemplary embodiment of the present invention;

FIG. 2B is a table illustrating application of an Apriori algorithm to determine frequency of an item set, according to an exemplary embodiment of the present invention;

FIG. 5A is a table illustrating a plurality of transactions, according to an embodiment of the present invention;

FIG. 5B is a table illustrating an encrypted form of the plurality of transactions from FIG. 5A, according to an embodiment of the present invention.

FIG. 6 depicts a process for association rule mining from encrypted databases, according to an exemplary embodiment of the present invention;

DETAILED DESCRIPTION

Figure 1:
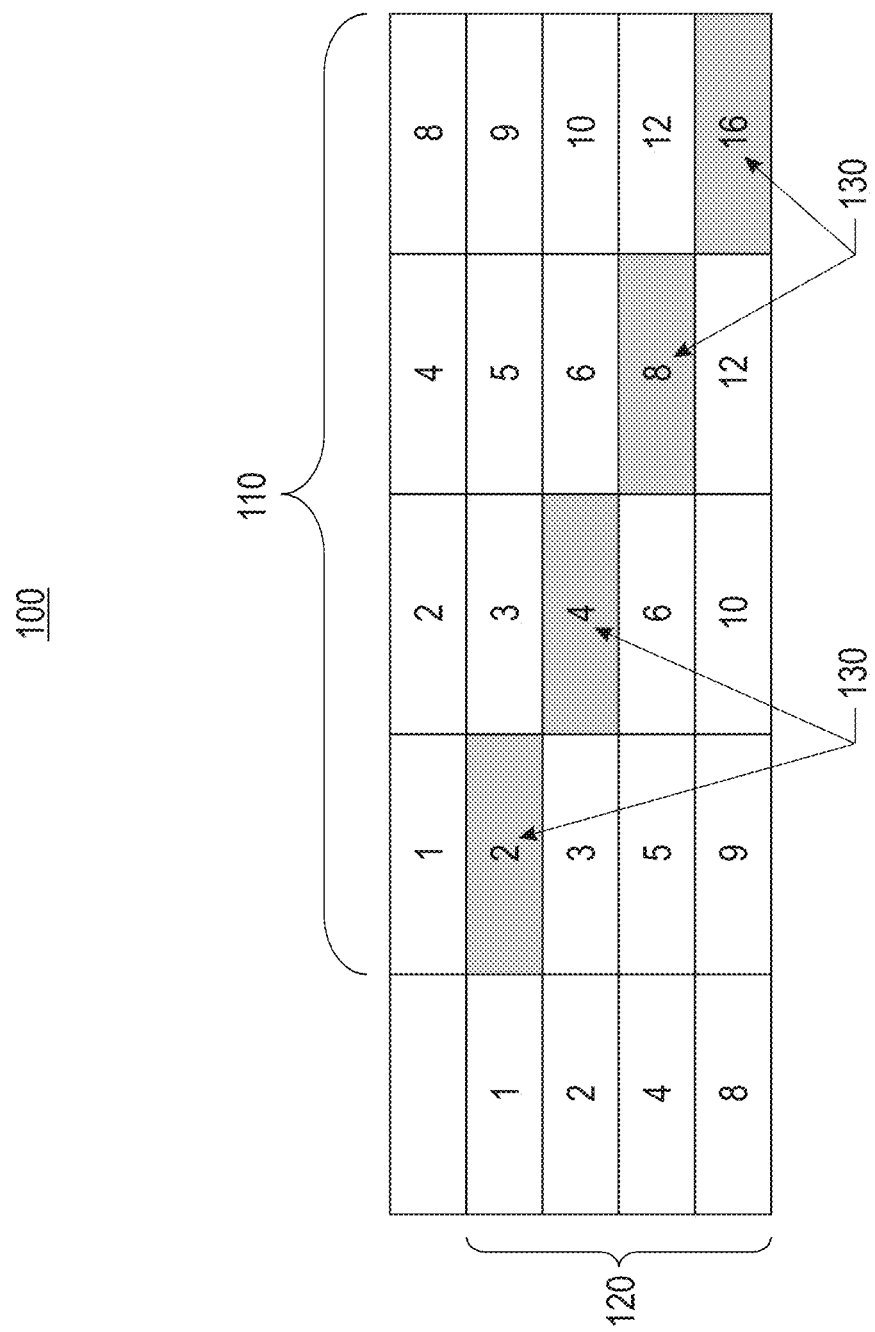
FIG. 1 is a table illustrating mapping of each element in a set to an integer such that the self-sum of each element is unique, according to an exemplary embodiment of the present invention.

Illustrative embodiments of the invention may be described herein in the context of illustrative methods, systems and devices for retrieving association rules from one or more encrypted cloud databases. However, it is to be understood that embodiments of the invention are not limited to the illustrative methods, systems and devices but instead are more broadly applicable to other suitable methods, systems and devices.

As used herein, "encryption" or "data encryption" can refer to the encoding of data into a secret code, referred to as ciphertext. An encryption algorithm is used to perform encryption. A secret key is used to decrypt the encrypted data into understandable form, which is referred to as plaintext, while a public key is used to encrypt the plaintext into ciphertext. Authorized users in possession of the secret key can decrypt the encrypted data.

In accordance with an aspect of the present invention, an encryption scheme is used for cloud database encryption that provides additive homomorphism. As used herein, a "homomorphism" refers to a structure preserving map between two algebraic structures that preserves the operations of the structures. For example, a map $f: A \rightarrow B$ between two sets A, B is equipped with the same structure such that, if + is an operation of the structure, then $f(x+y)=f(x)+f(y)$ for every pair x, y of elements of A. In a non-limiting example, applying + at the range of the function yields the same as result mapping after applying + at its domain, for example, if $f(x)=2x$, then, $f(1)+f(2)=2+4=6=f(1+2)$. As used herein, "additive homomorphism" refers to a homomorphism which permits the addition of two ciphertexts without decryption. An additive homomorphic encryption scheme guarantees preservation of the addition property over ciphertext. In some situations, an encryption scheme that provides additive homomorphism may also provide for the multiplication of a ciphertext with plaintext without decryption.

A non-limiting example of such an encryption scheme that provides additive homomorphism includes, Pallier encryption, but other encryption schemes which provide additive homomorphism may be used. With Pallier encryption, the product of two ciphertexts will decrypt to the sum of their corresponding plaintexts:

$$D(E(m_1,r_1) \cdot E(m_2,r_2)) \bmod n^2) = m_1+m_2 \bmod n \quad (1)$$

Further, the product of a ciphertext with a plaintext raising g will decrypt to the sum of the corresponding plaintexts:

$$D(E(m_1,r_1) \cdot g^{m_2} \bmod n^2) = m_1+m_2 \bmod n \quad (2)$$

In equations (1) and (2), D refers to a decryption function, E refers to an encryption function, m refers to a message (e.g., plaintext data), r refers to randomness where $0 \leq r \leq n$ (it is required to generate non-deterministic encryptions of plaintext messages), g refers to a generator of a group in $Z_n^*a$, n is the product of two large prime numbers p and q selected randomly and independently of each other such that $\gcd(pq,(p-1)(q-1))=1$. Further n divides the order of g.

In accordance with an aspect of the present invention, federated cloud databases are used to mine the association rules securely, with a minimum of 3 federated cloud databases. Collusions of federated cloud databases are permitted, as long as the number of federated clouds is more than 3, and the number of clusters of federated cloud databases after the collusions is a minimum of 3.

Referring to the table 100 in FIG. 1, a set of transactions T is assumed, where each transaction is a subset of a set S of cardinality n. A function $f$ maps each element of the set S to an integer, such that the self-sum of each element in the set S is unique. In a non-limiting example, S={bread, butter, jam, milk}, and $f(S)=\{1, 2, 4, 8\}$ (i.e., bread↔1, butter↔2, jam↔3 and milk↔4. Showing integers {1, 2, 4, 8} representing the elements are column and row headers 110, 120, and the numbers in each box are the sum of the row and column integers corresponding to the box. The highlighted boxes 130 depict the unique self-sums (i.e., 1+1=2, 2+2=4, 4+4=8 and 8+8=16), which are not repeated in the table. The other shown sums in the boxes appear more than once. As can be seen, the self-sums 130 are unique for the integers 1, 2, 4 and 8.

Referring to FIGS. 2A and 2B, a table 205 illustrates application of an Apriori algorithm to determine frequency of items, and a table 210 illustrates application of an Apriori algorithm to determine frequency of an item set, according to exemplary embodiments of the present invention. In a non-limiting illustrative example, a set S refers to a plurality of items, such as for example, bread, butter, jam, and milk, such that S={bread, butter, jam, milk}. A set T refers to a plurality of transactions for the items in set S, such as, for example purchasing bread and jam in a first transaction, bread and butter in a second transaction, and bread, butter and milk in a third transaction, where T={{bread, jam}, {bread, butter}, {bread, butter, milk}}.

Based on the function $f$ described in connection with FIG. 1, which maps each element of the set S to an integer, such that the self-sum of each element in the set S is unique, $f(S)=\{1, 2, 4, 8\}$ (i.e., bread↔1, butter↔2, jam↔4, milk↔8). Accordingly, assigning the integers to the transactions in set T, $f(T)=\{\{1, 4\}, \{1, 2\}, \{1, 2, 8\}\}$. Referring to FIG. 2A, in an initial step of an Apriori algorithm, used for frequent item set and association rule mining over a plurality of transactions, the $L_0$ set 206 of items is {{1}, {2}, {4}, {8}}.

Then, in order to check which elements are frequent, each element of the $L_0$ set 206 of items is respectively added to each of the transactions in the set T. For example, {1} is added to {{1, 4}, {1, 2}, {1, 2, 8}} to result in {{2, 5}, {2, 3}, {2, 3, 9}}, {2} is added to {{1, 4}, {1, 2}, {1, 2, 8}} to result in {{3, 6}, {3, 4}, {3, 4, 10}}, {4} is added to {{1, 4}, {1, 2}, {1, 2, 8}} to result in {{5, 8}, {5, 6}, {5, 6, 12}}, and 8 is added to {{1, 4}, {1, 2}, {1, 2, 8}} to result in {{9, 12}, {9, 10}, {9, 10, 16}}, as shown in each row under the Transactions column 207 in Table 205. Based on the results of adding each element of the $L_0$ set 206 of items to each of the transactions in the set T, the count 208 of each respective element of the $L_0$ set 206 is determined for the transactions T. As can be seen by the bolded numbers in each row of the Transaction column 207, the count of the appearance of the unique self-sum in the transactions is determined for a particular item $L_0$. For example, for item {1}, the resulting three {2} values yield a count of 3, for item {2}, the resulting two {4} values yield a count of 2, for item {4}, the resulting one {8} value yields a count of 1, and for item {8}, the resulting one {16} value yields a count of 1.

If minimum support (minsup)=2, which functions as a threshold to determine whether items are frequent, then items {1} and {2} are determined to be frequent because their counts are greater than or equal to minsup (i.e., 2).

Similarly, referring to Table 210 in FIG. 2B, it is determined that the itemset {1, 2} is also frequent. In the case of Table 210, the query is whether items {1} and {2} are frequent together. In order to check whether items {1} and {2} are frequent together, respective transactions from the first and second rows of the Transactions column 207 in Table 205 are combined. For example, {2, 5} is combined with {3, 6} to result in {2, 5, 3, 6}, {2, 3} is combined with {3, 4} to result in {2, 3, 4} (3, which repeats is dropped), and {2, 3, 9} is combined with {3, 4, 10} to result in {2, 3, 9, 4, 10} (3 which also repeats here is dropped). Based on the results of the combining, the count 218 of the combination of {1, 2} is determined for the transactions T. As can be seen by the bolded numbers in the Transaction column 217, the count of the appearance of the unique self-sums {2, 4} for the combination {1, 2} in the transactions is determined for items $L_1$ 216. For example, for items {1, 2} together, the resulting two {2, 4} values yield a count of 2. If minsup=2, then items {1, 2} together are determined to be frequent because the count is greater than or equal to minsup (i.e., 2).

In the case of items or itemsets determined to be frequent, association rules can be created based on data which include frequent antecedent/consequent (e.g., if/then) patterns to identify noteworthy relationships including the items and/or itemsets.

Figure 3:
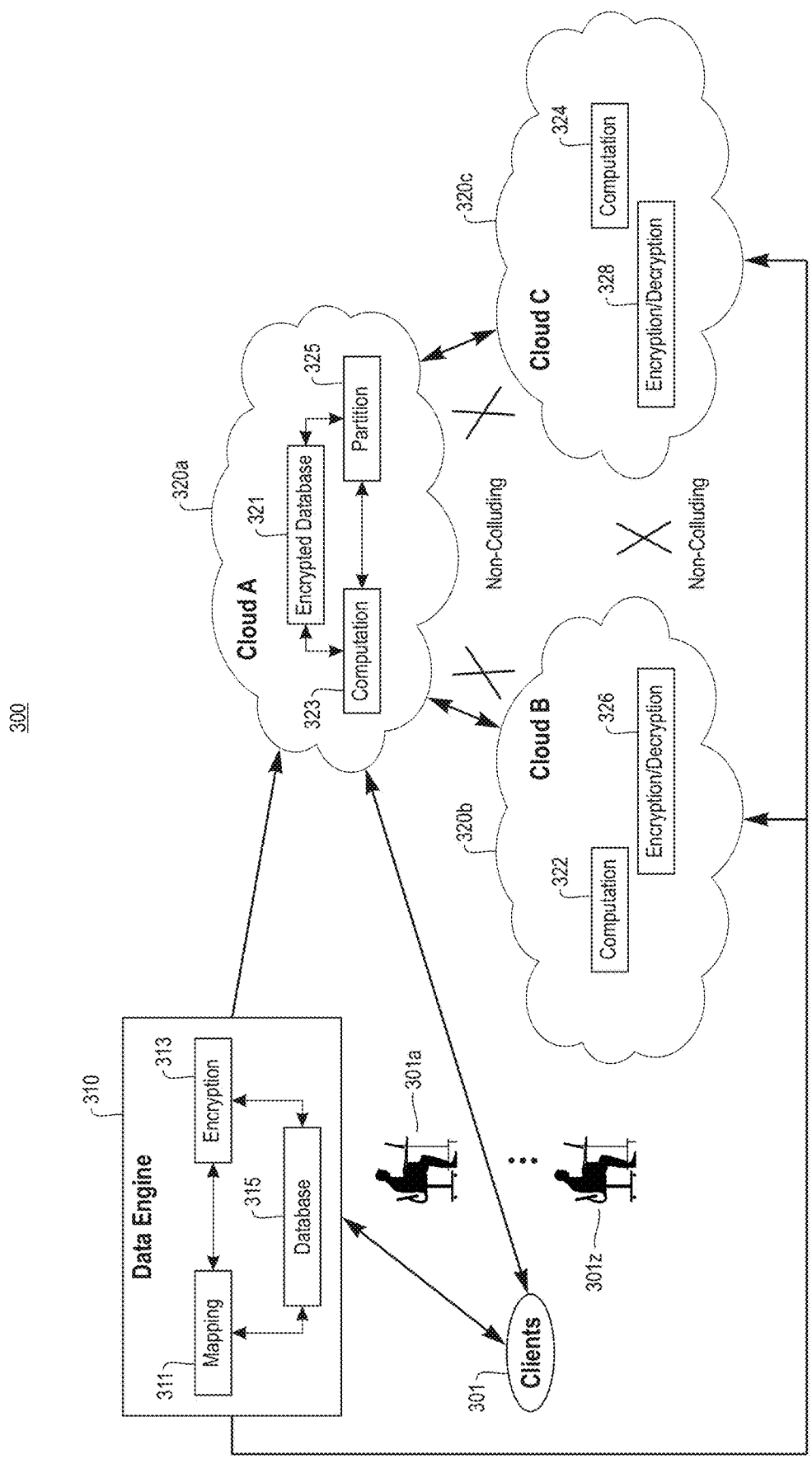
FIG. 3 depicts a system for association rule mining from encrypted databases, according to an embodiment of the present invention.

FIG. 3 is a block diagram of a system for association rule mining from encrypted databases, according to an exemplary embodiment of the present invention. As shown in FIG. 3 by lines and/or arrows, the components of the system 300 are operatively coupled to each other via, for example, physical connections, such as wired and/or direct electrical contact connections, and/or wireless connections, such as, for example, Wi-Fi™, BLUETOOTH®, IEEE 802.11, and/or networks, including but not limited to, a local area network (LAN), wide area network (WAN), cellular network, ad hoc networks, WANET, satellite network or the Internet.

By way of non-limiting example, in accordance with an embodiment of the present invention, referring to FIG. 3, the system 300 includes a data engine 310. According to an embodiment, the data engine 310 is maintained by an owner of the data ("data owner"), such as, for example, an organization, such as, but not necessarily limited to, a business (e.g., a retail, wholesale, service businesses), a financial institution, educational institution, a government entity and/or other entity or enterprise. The data engine 310 includes one or more internal databases 315 for storing the data, and mapping and encryption components 311 and 313, which will be explained in more detail herein below. The data owner sends one or more database services to at least three federated cloud service providers (also referred to herein as "cloud computing environments") 320a, 320b and 320c, who may provide such services as DBaaS and AaaS. Any number of clients 301_1-301_z (where z is an integer greater than 1) can access and/or make queries to the data through their computing devices to the cloud service provider 320a.

In accordance with an embodiment of the invention, a data owner, using the data engine 310, and more specifically an encryption component 313, encrypts its data prior to sending database services to cloud service providers 320a-320c. The data owner provides the encrypted data to the cloud service provider 320a.

More specifically, in an illustrative working example, the data owner has one or more sets S representing a plurality of items that the data owner sells, and one or more sets of transactions associated with the items. In an initialization step, a mapping component 311 performs a mapping function $f$ similar to the mapping described in connection with FIG. 1, which can be realized by finding a 1-1 mapping of the elements in a set S to a set of natural numbers whose self-sum is unique. The mapping component 311 transforms the transactions in a set T to integers based on the function $f$. This transformation is similar to the transformation of the transactions to integer combinations based on exponents of 2 (i.e., $2^n$) as described in connection with FIGS. 2A and 2B.

For instance, in keeping with the previously used example, assuming Bread↔1 and Butter↔2, and a set T contains two transactions {{Bread}, {Bread, Butter}}, then the transformed transactions will include {{1}, {1, 2}}. It is to be understood that embodiments of the present invention may include a large number of sets S and T comprising, for example, thousands, millions, billions, etc. of elements and/or combinations of elements amounting to gigabytes and terabytes of data, and that the examples used herein are simplified for ease of explanation.

Figure 4:
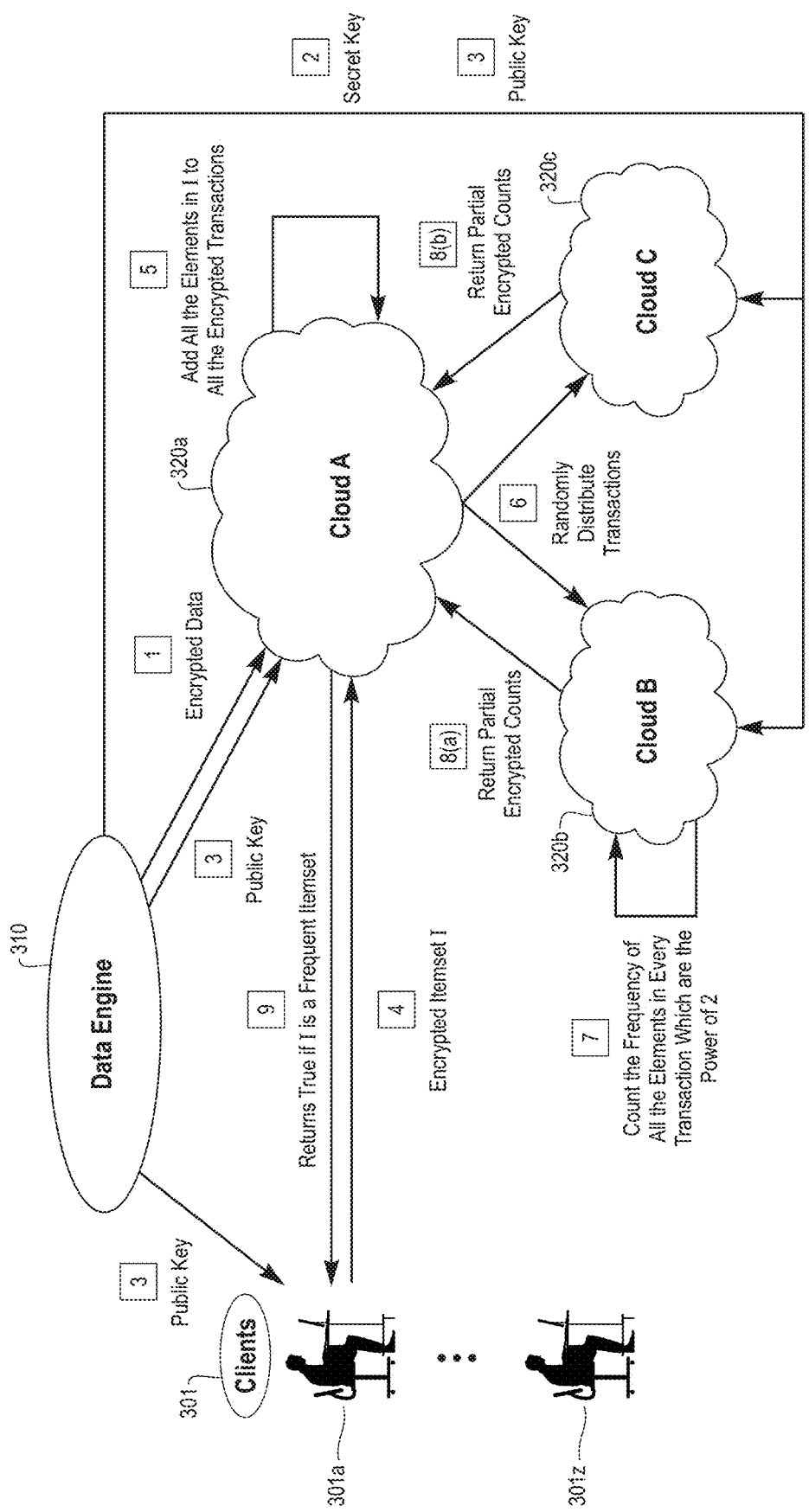
FIG. 4 illustrates a system representation of a process for association rule mining from encrypted databases, according to an exemplary embodiment of the present invention.

The encryption component 313 of the data engine encrypts every integer in the set T using Paillier encryption, or other encryption scheme that provides additive homomorphism, such as, for example, a BGN encryption scheme and Levelled Fully homomorphic encryption, in order to generate the encrypted set T'. As shown in FIG. 4, which illustrates a system representation of a process for association rule mining from encrypted databases, according to an exemplary embodiment of the present invention, the data engine 310 sends the encrypted transactions (set T') to the cloud service provider 320a (Cloud A) (Box 1 in FIG. 4). FIGS. 5A and 5B respectively illustrate tables 505 and 510 of examples of the set T of transactions, and the set T' of encrypted transactions sent to Cloud A 320a.

The data in encrypted format are hosted at the cloud database service provider 320a using an encryption scheme providing additive homomorphism. According to an embodiment, Cloud A 320a stores the encrypted transaction data in one or more encrypted databases 321. Cloud database providers 320b and 320c (Cloud B and Cloud C) participate in the system as described further herein below, but do not host the encrypted transaction data that are available via Cloud A 320a. The additive homomorphism property of the encryption scheme (e.g., Pallier cryptosystem) is used during the association rule mining process from the encrypted database 321 hosted on Cloud A 320a.

As noted above, neither Cloud B 320b nor Cloud C 320c host the encrypted database 321. However, in accordance with an embodiment of the present invention, the data owner provides the secret key to Clouds B and C 320b, 320c (see Box 2 in FIG. 4). In addition, according to an embodiment of the present invention, the data owner provides the public key to the clients 301 and to each of the Clouds A, B and C 320a-c (see Boxes 3 in FIG. 4). The public and private keys can be transmitted from the data owner via the data engine 310.

In the event that one or more clients 301 and/or a data owner wants to check if a particular item or itemset is frequent, the data engine 310 will apply the function $f$ over query items or itemsets (e.g., {bread}, {bread, butter}→{1}, {1, 2}) and will encrypt the query items or itemsets with the encryption scheme providing additive homomorphism (e.g., Paillier), and provides the encrypted query items or itemsets as input to Cloud A 320a. The provision of the encrypted query items or itemsets to Cloud A 320a can be directly from the data engine 310 or via the clients 301 as shown in Box 4 of FIG. 4. The query is encrypted using the same public key which is used to encrypt the set T.

In accordance with an embodiment of the invention, for each input, Cloud A 320a, using, for example, a computation component 323, computes the encrypted addition of the query items or itemsets (e.g., $L_0$ 206 and $L_1$ 216) with the encrypted transactions in the database. This computation is similar to the first part (addition step) in connection with the application of the Apriori algorithm discussed in connection with FIGS. 2A and 2B (see Box 5 in FIG. 4). In this case, because an additive homomorphism encryption scheme, which allows addition in the encrypted domain, is being used, the addition step in connection with application of the Apriori algorithm can be performed on the encrypted ciphertext, and still yield an accurate result. Because the data remain encrypted, Cloud A 320a is not computing Count (the second part of application of the Apriori algorithm) like what is discussed in connection with FIGS. 2A and 2B.

For each item or itemset, Cloud A 320a (using, for example, a partition component 325) randomly partitions the encrypted result of the addition of the encrypted query items or itemsets with the encrypted transactions (i.e., the output from the application of the additive part of the Apriori algorithm) into at least 2 subsets each comprising a different portion of the result of the addition of the encrypted query data with the encrypted transaction data, and sends the two subsets to Cloud B 320b and Cloud C 320c, respectively (see Box 6 in FIG. 4). Further, Cloud A 320a can add some spurious data or can add some additive noise to the data before sending the partitions to Cloud B 320b and Cloud C 320c.

The number of subsets can vary based on, for example, the number of clouds. For example, if more than 3 clouds are used (e.g., Clouds A, B, C and D), the partition component 325 can partition the encrypted transactions into at least 3 subsets to be respectively provided to Clouds B, C and D. The partitioning of the encrypted transactions provides a layer of security in addition to the encryption, since the data are separated and sent to two different clouds. Furthermore, the clouds do not collude with one another. As a result, if one of the clouds is compromised, a potential hacker is only able to obtain a list of random integers.

In accordance with an embodiment of the present invention, using, for example, encryption/decryption components 326 and 328, respectively, Cloud B and Cloud C 320b, 320c, which both have the secret key, each decrypt the respective subsets of the result received from Cloud A 320a after the partitioning. Using for example, respective computation components 322 and 324, Clouds B and C then each perform the second part of the Apriori algorithm by computing partial counts of the appearance of the unique self-sum in the subset transactions for a particular item. The method for performing the second part of the Apriori algorithm is described in more detail herein above in connection with FIGS. 2A and 2B. The appearance of the unique self-sum is determined by, for example, checking if the number is an exponent of 2) (see Box 7 in FIG. 4). Using, for example, the public key, Clouds B and C 320b, 320c encrypt the partial counts using the encryption scheme, and send the encrypted partial counts back to Cloud A 320a (see boxes 8(a) and 8(b) in FIG. 4). The encryption can be performed using, for example, encryption/decryption components 326 and 328, respectively.

According to an embodiment of the present invention, since the encryption scheme being used (e.g., Pallier) has the additive homomorphic property, Cloud A 320a adds the encrypted partial counts without having to perform decryption. Cloud A 320a sends the encrypted sum and encrypted min-support (minsup) to either Cloud B 320b or Cloud C 320c. Cloud B or C decrypts the encrypted sum and encrypted min-sup, and then determines whether the resulting count for each item or itemset is greater than minsup. For counts greater than minsup, Cloud B or C returns a "true" value to Cloud A to indicate which of the queried items or itemsets are frequent. Then, Cloud A returns those "true" values to the clients 301 and/or data owner, in connection with inputted encrypted items or itemsets determined to be frequent (see Box 9 of FIG. 4).

The above-described sequence of steps completes one iteration of the Apriori algorithm, which verifies whether the min-support for an item or itemset is met or not met. In accordance with an embodiment of the present invention, iterations are repeated for each of the singular items in a query set (e.g., $L_0$ 206), and for each of the itemsets having 2 or more items (e.g., $L_1$ 216). The method continues until all queried items and itemsets are explored to determine whether minsup is met.

In accordance with an embodiment of the present invention, if the number of items represented is very large, then instead of representing the items in a 1-dimensional flat structure, a hierarchical representation for the items is used, with different categories in each hierarchy. In non-limiting illustrative examples, a hierarchal representation may include relatively general categories, such as clothes and groceries, and then more specific categories under the general categories, such as, for example, shirts and pants, and fruit and meat, respectively. Other relatively general categories may be based on use, such as, for example, daily use, or infrequent use. The actual items will be present in the leaf level (e.g., of a data tree), and a combination of the category identifiers in each level becomes the identifier for the item at the leaf level. The specific algorithm steps that apply in a 1-dimensional representation described herein above are repeated independently for each category in the hierarchy in the multi-dimensional representation.

FIG. 6 is a flow diagram of a process for association rule mining from encrypted databases, according to an exemplary embodiment of the invention. Referring to FIG. 6, the process 600 includes, at block 601, receiving, at a first cloud computing environment (e.g., Cloud A 320a), encrypted transaction data that are encrypted using an encryption scheme. The encryption scheme provides additive homomorphism, such as, for example, a Pallier encryption scheme. The transaction data comprise a plurality of combinations of two or more elements of a set of elements.

The process 600 also includes, at block 603, receiving, at the first cloud computing environment, encrypted query data that are encrypted using the encryption scheme providing additive homomorphism. The query data comprise at least an element and/or a combination of two or more elements of the set of elements, which are the subject of a query. The query seeks a determination of whether at least the element and/or the combination of two or more elements is frequent.

The process 600 further includes, at block 605, computing addition of the encrypted query data with the encrypted transaction data. As noted herein, the additive homomorphism property of the encryption scheme permits the addition of encrypted data without preforming decryption. According to an embodiment of the present invention, the computing is performed at the first cloud computing environment.

The process 600 can include determining a mapping of each element in the set of elements to respective natural numbers, wherein a self-sum of each of the respective natural numbers is unique. Prior to encrypting of the transaction data, the transaction data can be transformed into a plurality of integer combinations based on the mapping. Prior to encryption of the query data, the query data can be transformed into one or more integers based on the mapping.

In accordance with an embodiment of the present invention a secret or decryption key for the encryption scheme is provided to a second cloud computing environment and a third cloud computing environment, and not to the first cloud computing environment, while a public key for the encryption scheme is provided to each of the first, second cloud and third cloud computing environments.

The process 600 may further include partitioning a result of the addition of the encrypted query data with the encrypted transaction data into at least two subsets each comprising a different portion of the result of the addition of the encrypted query data with the encrypted transaction data. A first of the at least two subsets is transmitted from the first cloud computing environment to a second cloud computing environment (e.g. Cloud B 320b), and a second of the at least two subsets is transmitted from the first cloud computing environment to a third cloud computing environment (e.g., Cloud C 320c). The first and the second of the at least two subsets are decrypted at the second and third cloud computing environments, respectively.

Then, in the second cloud computing environment, a first partial count of the appearance of a unique self-sum of at least one of the element and the combination of two or more elements from the query in the first of the at least two subsets is computed. Similarly, in the third cloud computing environment, a second partial count of the appearance of a unique self-sum of at least one of the element and the combination of two or more elements from the query in the second of the at least two subsets is computed. The computed first and second partial counts are encrypted in the first and second cloud computing environments using the encryption scheme. The encrypted computed first and second partial counts are then transmitted from the second and third cloud computing environments, respectively, to the first cloud computing environment.

An addition of the encrypted computed first and second partial counts is performed in the first computing environment without performing a decryption, and an encrypted result of the addition of the encrypted computed first and second partial counts is transmitted from the first cloud computing environment to the second or third cloud computing environment. An encrypted minimum-support (min-sup) value is also transmitted from the first cloud computing environment to the second or third cloud computing environment.

The encrypted result of the addition of the encrypted computed first and second partial counts and the encrypted minimum-support value are decrypted at the second or third cloud computing environment where they were transmitted. Then, a decrypted total count resulting from the addition of first and second partial counts, and whether the decrypted total count is greater than the minimum-support value are determined.

A true value is returned to the first cloud computing environment from the second or third cloud computing environments in response to a determination that the decrypted total count is greater than the minimum-support value, and the true value is transmitted from the first cloud computing environment to a client and/or a data owner in response to the query.

The present invention may be implemented via a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
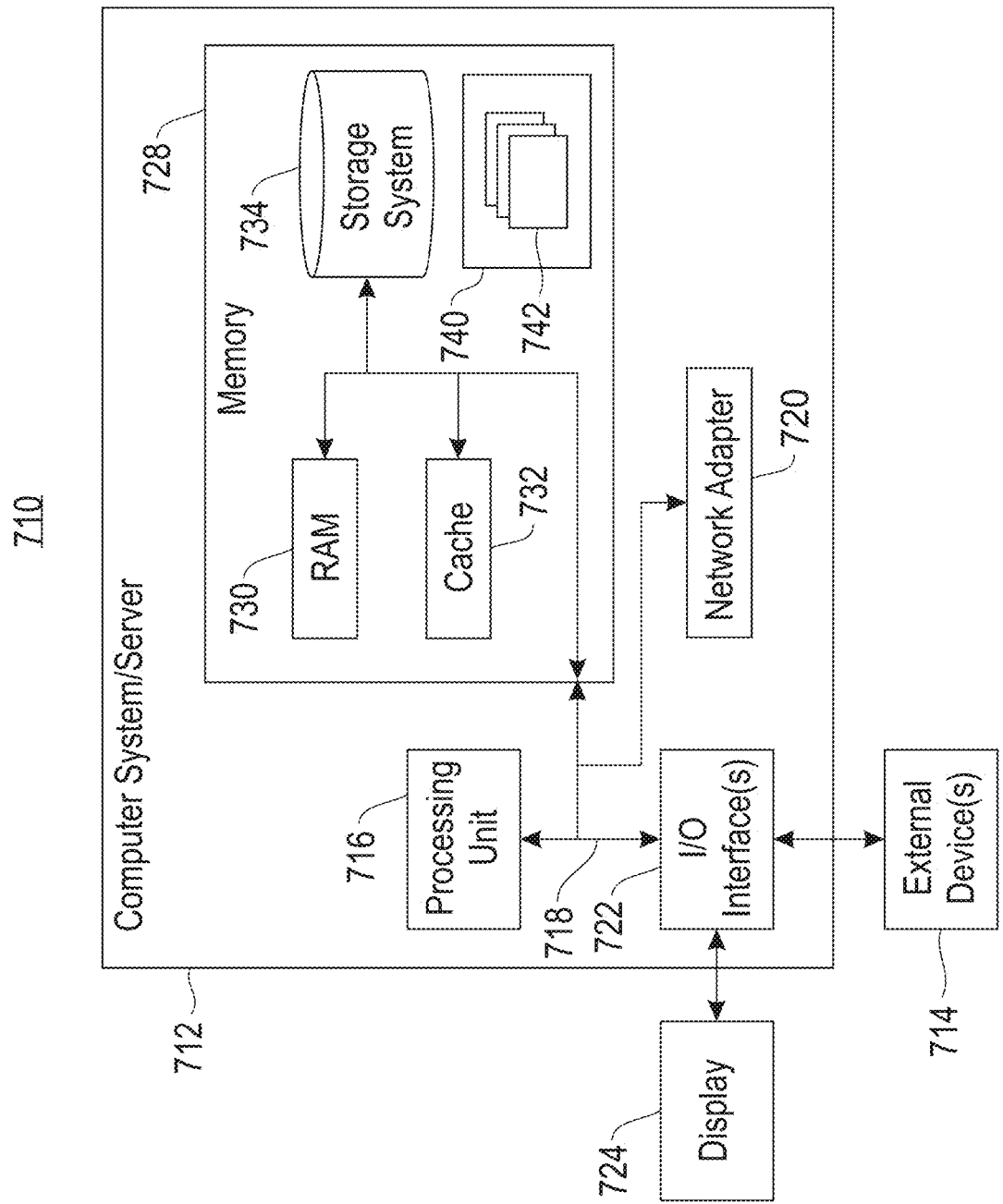
FIG. 7 depicts a computer system in accordance with which one or more components/steps of techniques of the invention may be implemented, according to an exemplary embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as RAM 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
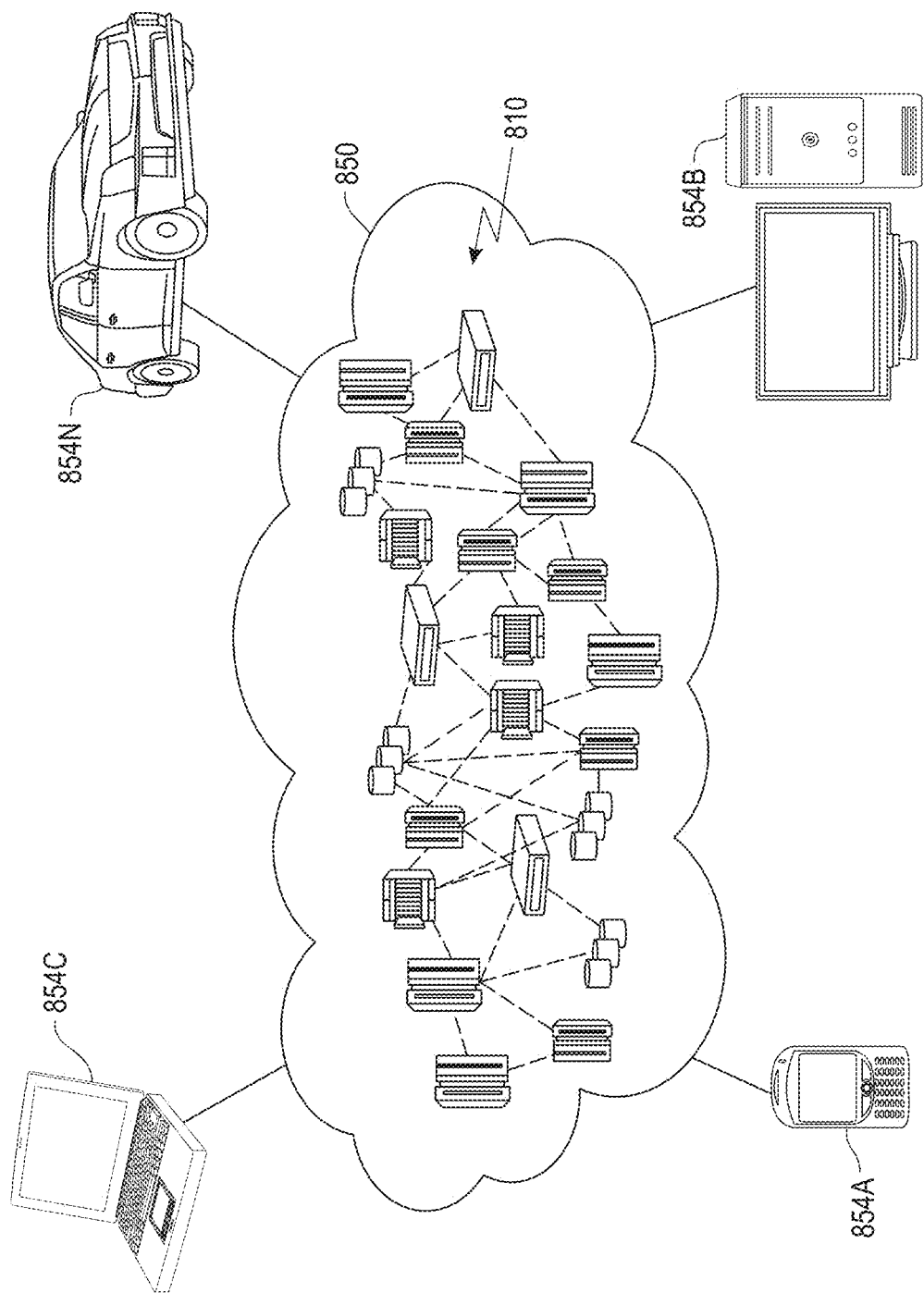
FIG. 8 depicts a cloud computing environment, according to an exemplary embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, a PDA or a cellular telephone 854A, a desktop computer 854B, a laptop computer 854C, and/or an automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
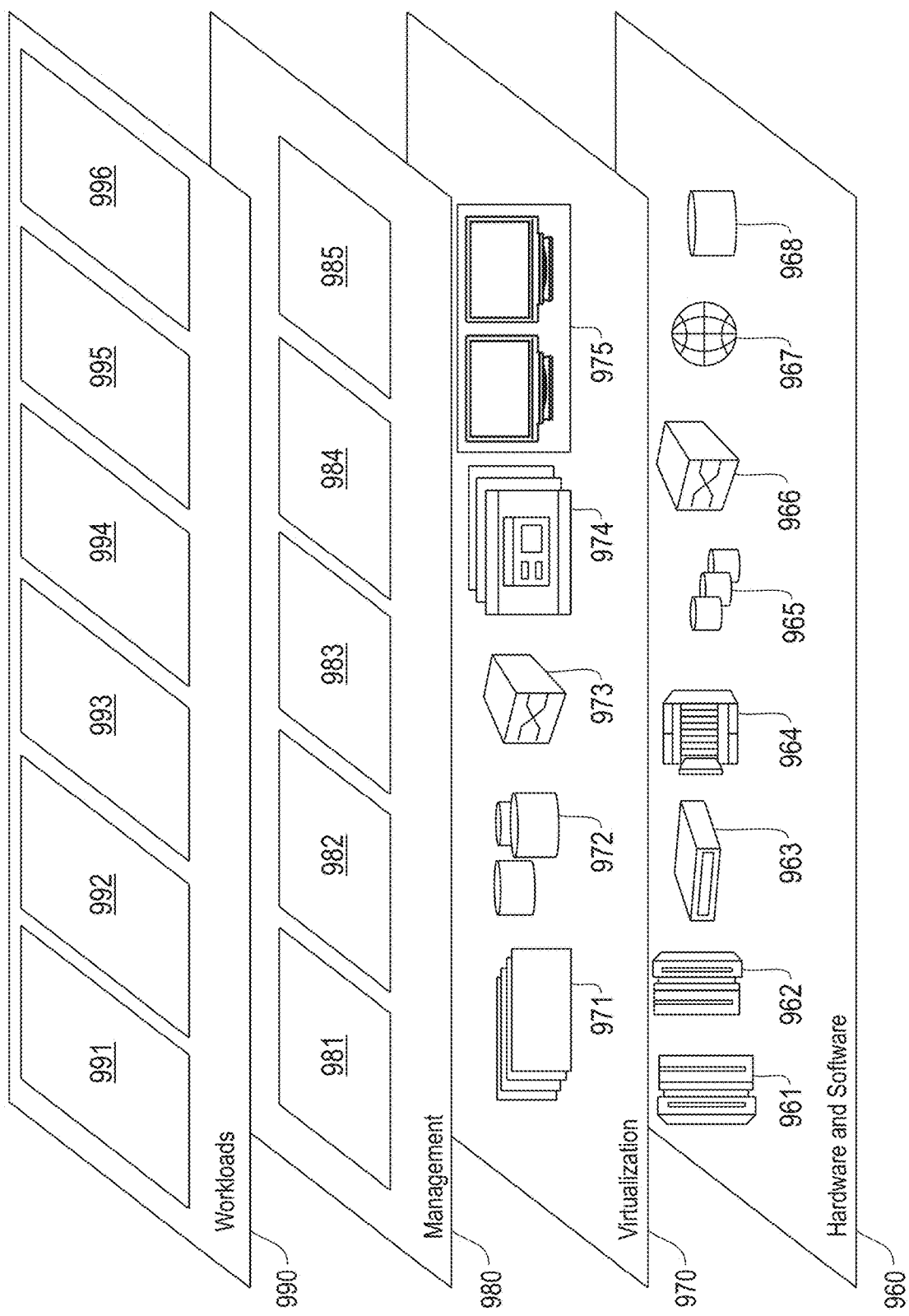
FIG. 9 depicts abstraction model layers, according to an exemplary embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and association rule processing 996, which may perform various functions described above with respect to system 300.

Advantageously, embodiments of the present invention permit association rule mining from encrypted databases by utilizing an encryption scheme which provides additive homomorphism. The encryption scheme is also non-deterministic. Security of data is enhanced by the implementation of the embodiments of the present invention because, unlike conventional methods, encrypted data do not need to be decrypted prior to computing the addition of query and transaction data, or when adding encrypted partial counts to determine whether elements are frequent in connection with the performance of an Apriori algorithm. Furthermore, the embodiments of the present invention utilize at least three federated cloud computing environments, which do not collude with each other. Unlike conventional arrangements, security is enhanced due to a first one of the cloud computing environments which does not decrypt the data and which performs computations (e.g., addition) on encrypted data, while the second and third cloud computing environments decrypt part of the data without receiving other parts of the data. Accordingly, the association rules mined and the minimum threshold on support and confidence of the frequent itemset are not known to the database server (e.g., first cloud computing environment).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
   determining a mapping of each element in a set of elements to respective natural numbers, wherein a self-sum of each of the respective natural numbers is unique;
   transforming transaction data into a plurality of integer combinations based on the mapping, wherein the transforming is performed prior to encrypting of the transaction data, and wherein the transaction data comprise a plurality of combinations of two or more elements of the set of elements;
   receiving, at a first cloud computing environment, the encrypted transaction data that are encrypted using an encryption scheme which provides additive homomorphism;
   receiving, at the first cloud computing environment, encrypted query data that are encrypted using the encryption scheme, wherein the query data comprise at least one of an element and a combination of two or more elements of the set of elements which are the subject of a query seeking a determination of whether at least one of the element and the combination of two or more elements is frequent;
   computing addition of the encrypted query data with the encrypted transaction data;
   partitioning a result of the addition of the encrypted query data with the encrypted transaction data into at least two subsets comprising different portions of the result of the addition;
   transmitting a first of the at least two subsets from the first cloud computing environment to a second cloud computing environment; and
   transmitting a second of the at least two subsets from the first cloud computing environment to a third cloud computing environment.

2. The computer-implemented method of claim 1, wherein the encryption scheme comprises Pallier encryption.

3. The computer-implemented method of claim 1, further comprising:
transforming the query data into one or more integers based on the mapping, wherein the transforming is performed prior to encrypting of the query data.

4. The computer-implemented method of claim 1, further comprising:
providing a secret key for the encryption scheme to the second cloud computing environment and the third cloud computing environment.

5. The computer-implemented method of claim 4, further comprising:
providing a public key for the encryption scheme to each of the first cloud, second cloud and third cloud computing environments.

6. The computer-implemented method of claim 1, further comprising:
encrypting the computed first and second partial counts using the encryption scheme; and
transmitting the encrypted computed first and second partial counts from the second and third cloud computing environments, respectively, to the first cloud computing environment.

7. The computer-implemented method of claim 6, further comprising:
computing, in the first cloud computing environment, an addition of the encrypted computed first and second partial counts without performing a decryption.

8. The computer-implemented method of claim 7, further comprising:
transmitting an encrypted result of the addition of the encrypted computed first and second partial counts from the first cloud computing environment to one of the second and third cloud computing environments.

9. The computer-implemented method of claim 8, further comprising:
transmitting an encrypted minimum-support value from the first cloud computing environment to said one of the second and third cloud computing environments.

10. The computer-implemented method of claim 9, further comprising:
decrypting the encrypted result of the addition of the encrypted computed first and second partial counts;
determining a decrypted total count resulting from the addition of first and second partial counts at said one of the second and third cloud computing environments; and
determining whether the decrypted total count is greater than the minimum-support value at said one of the second and third cloud computing environments.

11. The computer-implemented method of claim 9, further comprising:
decrypting the encrypted minimum-support value at the one of the second and third cloud computing environments.

12. The computer-implemented method of claim 10, further comprising transmitting a true value to the first cloud computing environment from said one of the second and third cloud computing environments in response to a determination that the decrypted total count is greater than the minimum-support value.

13. The computer-implemented method of claim 12, further comprising transmitting the true value from the first cloud computing environment to at least one of a client and a data owner in response to the query.

14. A computer program product, the computer program product comprising a computer readable storage medium having program instructions embodied therewith, the program instructions executable by a device to cause the device to:
determine a mapping of each element in a set of elements to respective natural numbers, wherein a self-sum of each of the respective natural numbers is unique;
transform transaction data into a plurality of integer combinations based on the mapping, wherein the transforming is performed prior to encrypting of the transaction data, and wherein the transaction data comprise a plurality of combinations of two or more elements of the set of elements;
receive the encrypted transaction data that are encrypted using an encryption scheme which provides additive homomorphism;
receive encrypted query data that are encrypted using the encryption scheme, wherein the query data comprise at least one of an element and a combination of two or more elements of the set of elements which are the subject of a query seeking a determination of whether at least one of the element and the combination of two or more elements is frequent;
compute addition of the encrypted query data with the encrypted transaction data;
partition a result of the addition of the encrypted query data with the encrypted transaction data into at least two subsets comprising different portions of the result of the addition;
transmit a first of the at least two subsets from a first cloud computing environment to a second cloud computing environment; and
transmit a second of the at least two subsets from the first cloud computing environment to a third cloud computing environment.

15. A system comprising:
a memory; and
at least one processor coupled to the memory and configured for:
determining a mapping of each element in a set of elements to respective natural numbers, wherein a self-sum of each of the respective natural numbers is unique;
transforming transaction data into a plurality of integer combinations based on the mapping, wherein the transforming is performed prior to encrypting of the transaction data, and wherein the transaction data comprise a plurality of combinations of two or more elements of the set of elements;
receiving the encrypted transaction data that are encrypted using an encryption scheme which provides additive homomorphism;
receiving encrypted query data that are encrypted using the encryption scheme, wherein the query data comprise at least one of an element and a combination of two or more elements of the set of elements which are the subject of a query seeking a determination of whether at least one of the element and the combination of two or more elements is frequent;
computing addition of the encrypted query data with the encrypted transaction data;

partitioning a result of the addition of the encrypted query data with the encrypted transaction data into at least two subsets comprising different portions of the result of the addition;

transmitting a first of the at least two subsets from a first cloud computing environment to a second cloud computing environment; and transmitting a second of the at least two subsets from the first cloud computing environment to a third cloud computing environment.

16. A computer-implemented method, comprising:

encrypting transaction data using an encryption scheme which provides additive homomorphism, wherein the transaction data comprise a plurality of combinations of two or more elements of a set of elements;

transmitting the encrypted transaction data to a first cloud computing environment;

receiving a query seeking a determination of whether at least one of an element and a combination of two or more elements of the set of elements is frequent;

encrypting query data using the encryption scheme, wherein the query data comprise at least one of the element and the combination of two or more elements which are the subject of the query;

transmitting the encrypted query data to the first cloud computing environment;

computing addition of the encrypted query data with the encrypted transaction data in the first cloud computing environment;

partitioning a result of the addition of the encrypted query data with the encrypted transaction data into at least two subsets comprising different portions of the result of the addition;

transmitting a first of the at least two subsets from the first cloud computing environment to a second cloud computing environment;

transmitting a second of the at least two subsets from the first cloud computing environment to a third cloud computing environment;

decrypting the first and the second of the at least two subsets at the second and third cloud computing environments, respectively computing, in the second cloud computing environment, a first partial count of the appearance of a unique self-sum of at least one of the element and the combination of two or more elements from the query in the first of the at least two subsets; and computing, in the third cloud computing environment, a second partial count of the appearance of a unique self-sum of at least one of the element and the combination of two or more elements from the query in the second of the at least two subsets;

wherein the steps are carried out by at least one computing device.

* * * * *